United States Patent [19]

Kobayashi et al.

[11] Patent Number: 4,865,103

[45] Date of Patent: Sep. 12, 1989

[54] PNEUMATIC RADIAL TIRE

[76] Inventors: Kazuomi Kobayashi, 5-5, Ogawahigashi-Cho 3-Chome, Kodaira City, Tokyo; Minoru Nakano, 1-12, Nukuiminami-Cho 1-Chome, Koganei City Tokyo both of Japan

[21] Appl. No.: 78,951

[22] Filed: Jul. 29, 1987

[30] Foreign Application Priority Data

Jul. 31, 1986 [JP] Japan .................................. 61-181048

[51] Int. Cl.⁴ ................................................ B60C 9/28
[52] U.S. Cl. ...................................... 152/536; 152/538
[58] Field of Search .................. 152/535, 536, 538, 527

[56] References Cited

U.S. PATENT DOCUMENTS 3,656,533  4/1972  Barassi et al. .................... 152/538 X
3,874,436  4/1975  Hashida et al. ................... 152/536 X
4,176,703 12/1979  Nojima et al. .................... 152/538 X Primary Examiner—Michael W. Ball
Assistant Examiner—Ramon R. Hoch

[57] ABSTRACT

A pneumatic radial tire includes a belt layer consisting of a plurality of belt plies reinforced by cords. The cords of at least two adjacent belt plies are oblique in opposite directions with respect to an equatorial plane of the tire. The tire comprises a relieving ply overlapping the belt plies. A modulus of the relieving ply is less than that of the belt plies. A width of the relieving ply is wider than that of the belt ply having the widest width. Cords reinforcing the relieving ply is oblique with respect to the equatorial plane in the same directions as those of cords of the belt ply having the widest width. Separations at belt ends of the maximum width belt ply is effectively prevented.

8 Claims, 10 Drawing Sheets

FIG_1
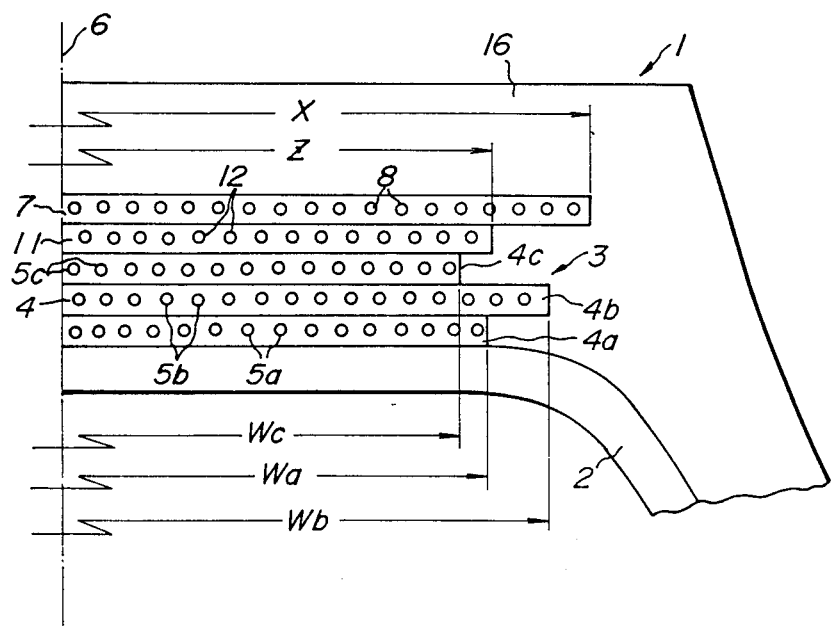

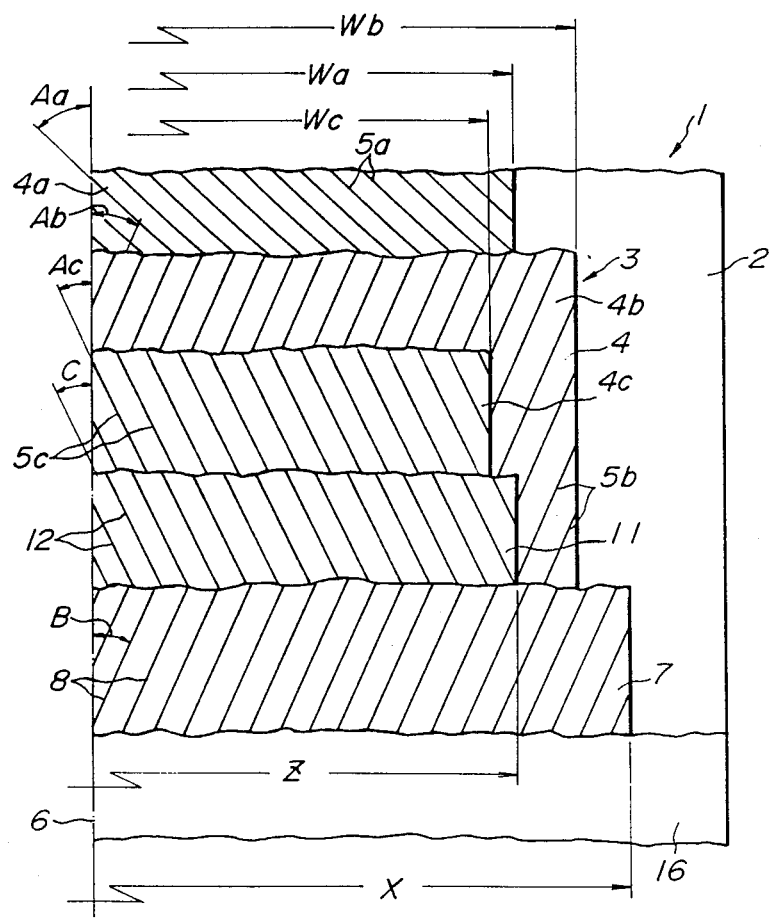
FIG_2

FIG_3
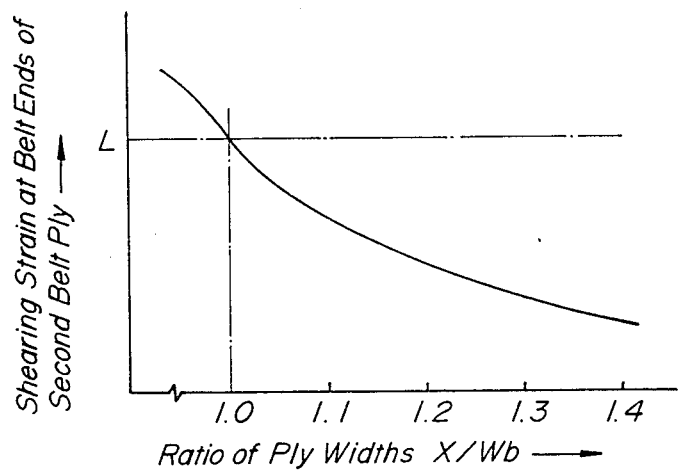
FIG_4
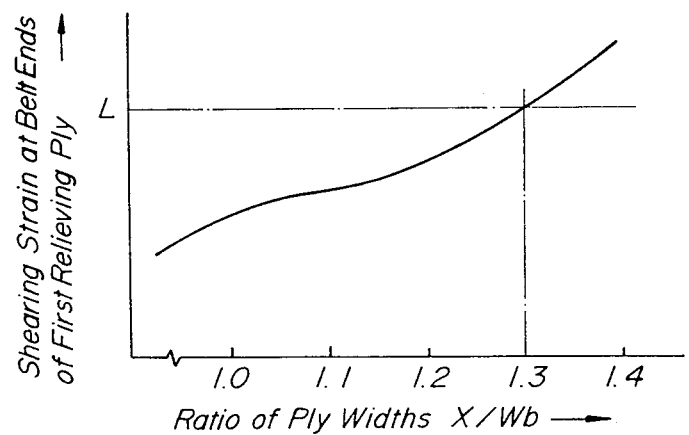

FIG_7
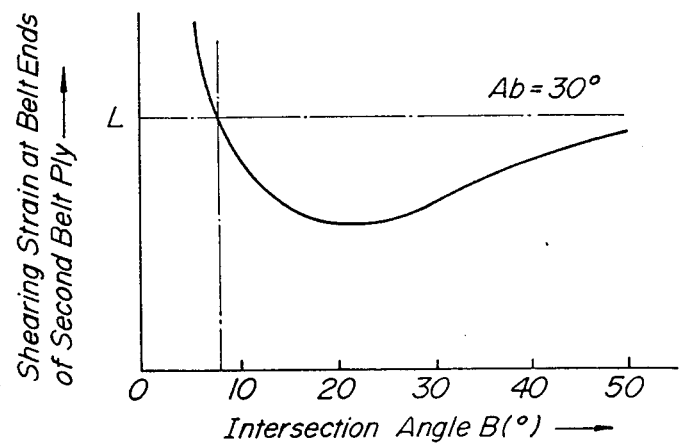
FIG_8
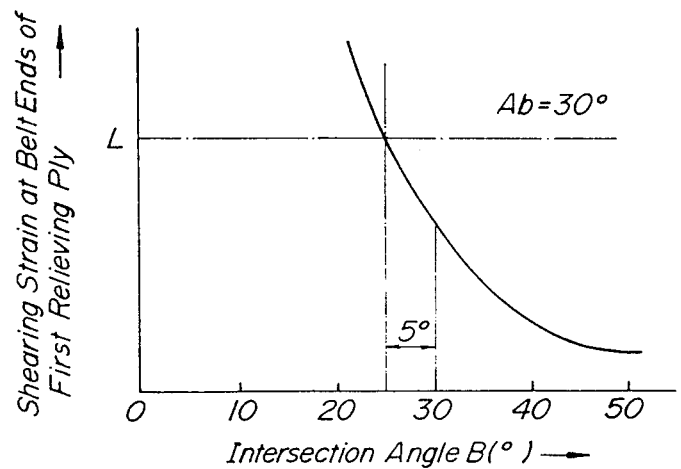

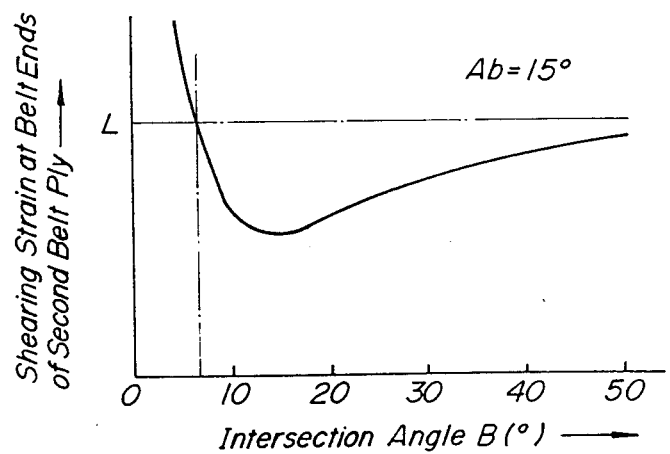
FIG_9
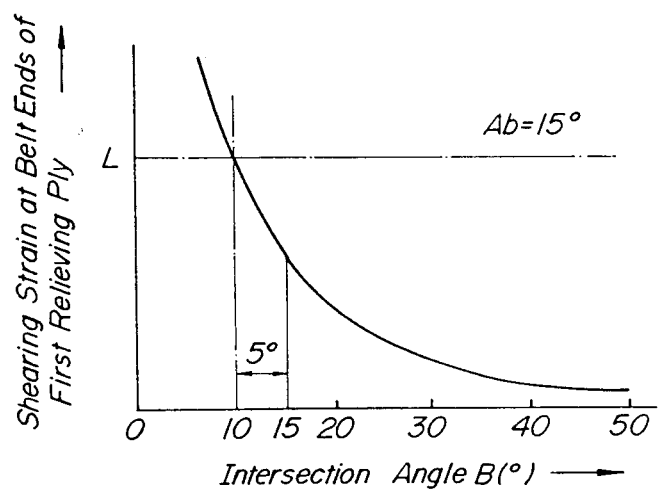
FIG_10

FIG_11a
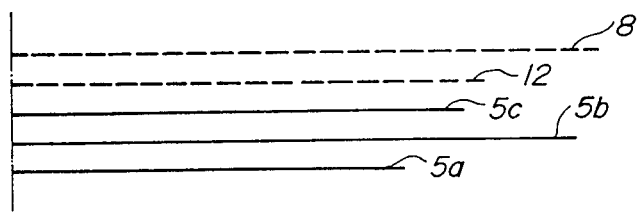
FIG_11b
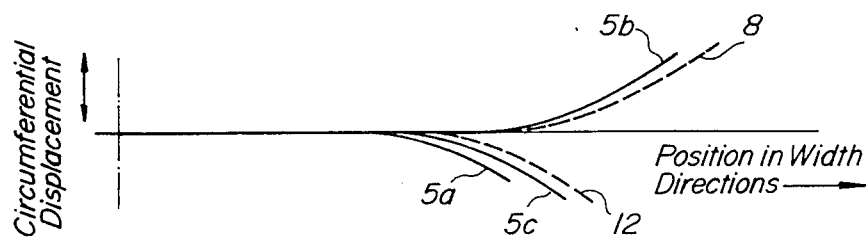
FIG_12a
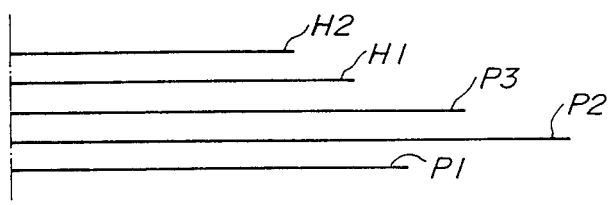
FIG_12b
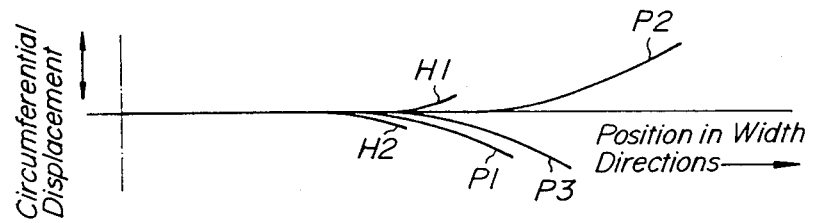

FIG_13a
*Comparison Tire 1*
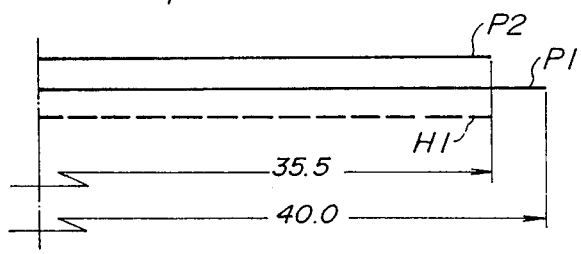
FIG_13b
*Sample Tire 1*
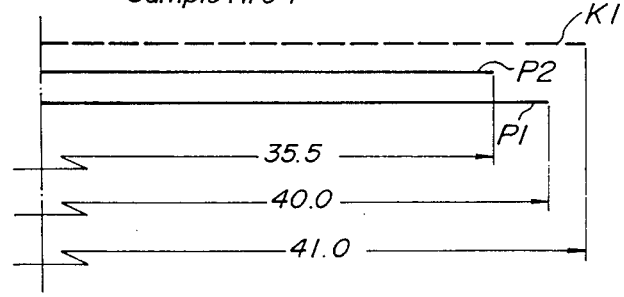
FIG_13c
*Sample Tire 2*
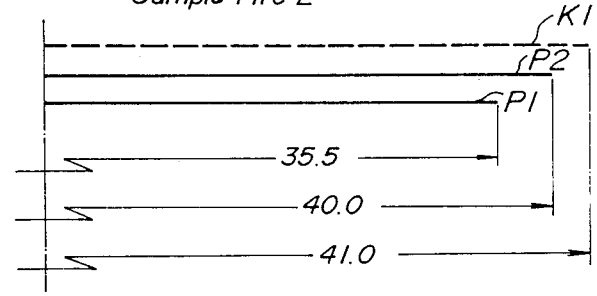

FIG_14a
Comparison Tire 2
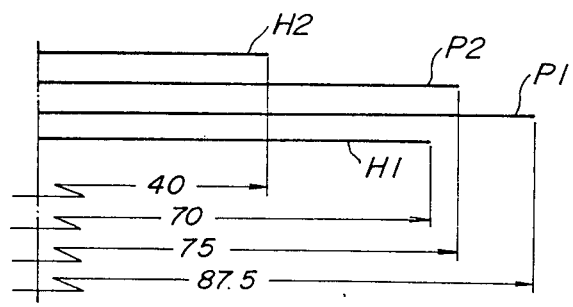
FIG_14b
Sample Tire 3
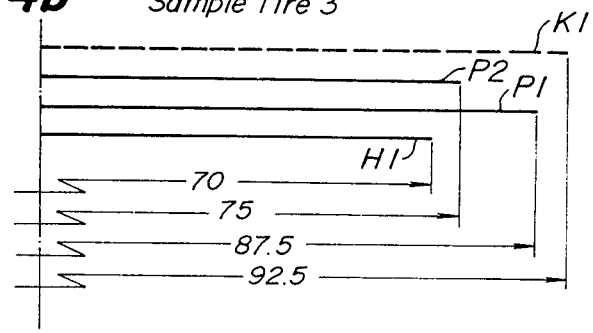
FIG_14c
Sample Tire 4
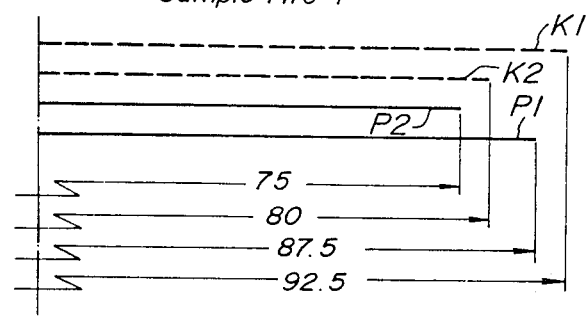

FIG_15a
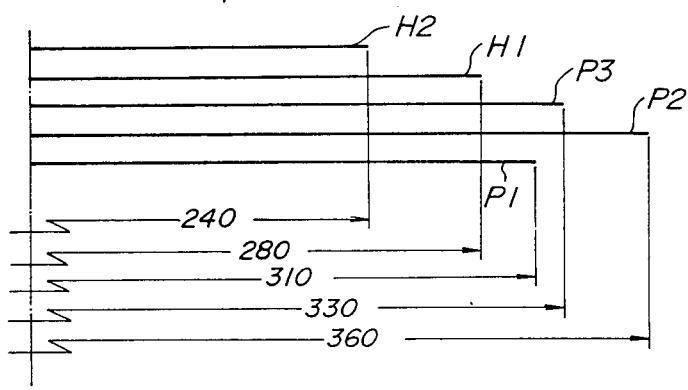
Comparison Tire 3
FIG_15b
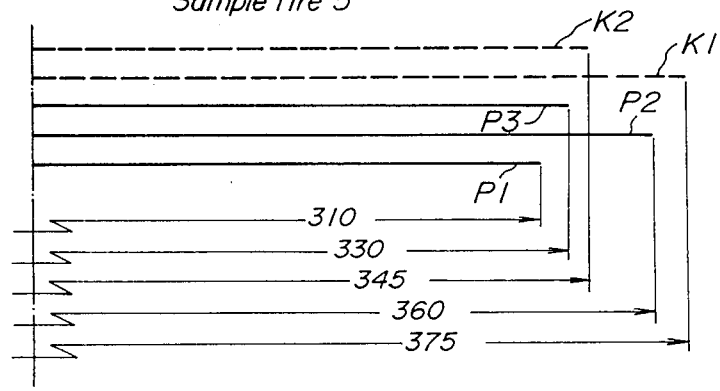
Sample Tire 5
FIG_15c
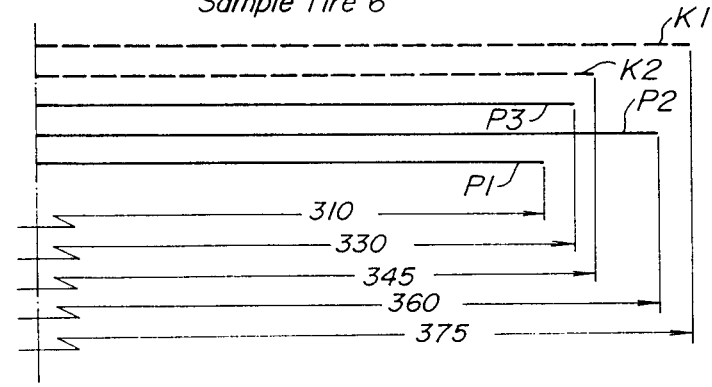
Sample Tire 6

PNEUMATIC RADIAL TIRE

BACKGROUND OF THE INVENTION

This invention relates to a pneumatic radial tire capable of effectively preventing separations at ends of belts.

In general, a pneumatic radial tire includes belt layers consisting of a plurality of belt plies reinforced by cords arranged radially outwardly of carcass layers reinforced by radially extending cords. When such a tire is subjected to a load, the belt plies are pulled to cause the cords embedded therein to slightly tilt and deform. These displacements of the cords progressively increase as the displaced portions are nearer to longitudinal ends of the cords or nearer to ends of the belt plies in their width directions. Moreover, the wider the belt plies, the larger the displacements of the cords. As a result, large circumferential shearing strains occur between the ends of the cords and the rubber about the ends at both ends of the maximum width belt ply in its width directions, resulting often into separations between the ends of the cords and the rubber.

In order to prevent the separations at both the ends of the maximum width belt ply, therefore, an attempt has been made to restrain the displacements of the cords by changing intersection angles of the cords of the belt plies with equatorial planes of tires, moduli and configurations of the belt plies, configurations of the belt layers and the like in various manners.

With such an attempt, however, the separations could not be securely prevented for large-sized tires, for example, used in trucks, buses and large construction vehicles, although separations of relatively small tires used for example for passenger cars are effectively prevented.

SUMMARY OF THE INVENTION

It is a primary object of the invention to provide an improved pneumatic radial tire which is able to effectively prevent separations at belt ends of a belt ply having the maximum width.

In order to achieve this object, the pneumatic radial tire including a belt layer consisting of a plurality of belt plies reinforced by cords, among which cords of at least two adjacent belt plies are oblique in opposite directions with respect to an equatorial plane of the tire according to the invention comprises a relieving ply arranged overlapping said belt plies and having a modulus less than that of said belt plies and a width wider than that of a belt ply having the widest width among said belt plies, and cords reinforcing said relieving ply being oblique with respect to said equatorial plane in the same directions as those of cords of the belt ply having the widest width.

When the pneumatic radial tire according to the invention is subjected to a load, the belt layer is pulled to displace the cords of the belt plies and the relieving ply. The displacement of the cords increases as the displaced locations are nearer to both ends of the belt plies. In this case, the oblique directions of the cords of the relieving ply are the same as the directions of the cords of the maximum width belt ply which would be subjected to the maximum circumferential shearing strain at the belt ends, and the width of the relieving ply is wider than the maximum width of the maximum width belt ply. Accordingly, rubber in the proximity of the ends of the cords of the relieving ply is deformed by the cords of the relieving ply so that the deformed rubber causes rubber in the proximity of the ends of the cords of the maximum width belt ply to deform in the same directions as displacement directions of the cords of the maximum width belt ply. As a result, the relative displacement between the cord ends of the maximum width belt ply and the rubber about the cord ends is reduced so that the circumferential shearing strains are reduced and hence the separation at the belt ends of the maximum belt ply is effectively prevented. In this case, moreover, as the modulus of the relieving ply is less than that of the belt plies, the displacement of the cords of the relieving ply at the belt ends is not very large, even if the width of the relieving ply is wider than that of the maximum width belt ply. As a result, the separation caused by the circumferential shearing strains at the belt ends of the relieving ply does not occur.

In order that the invention may be more clearly understood, preferred embodiments will be described, by way of example, with reference to the accompanying drawings.

BREIF DESCRIPTION OF THE DRAWINGS

FIG. 1 is a sectional view of a tire of one embodiment of the invention taken along an equatorial plane of the tire;

FIG. 2 is a sectional plan view of the tire;

FIG. 3 is a graph illustrating the relation between the shearing strain at belt ends of the second belt ply and ratio of ply widths;

FIG. 4 is a graph illustrating the relation between the shearing strain at belt ends of the first relieving ply and ratio of ply widths;

FIG. 7 is a graph illustrating the relation between the shearing strain at belt ends of the second belt ply and intersection angles B;

FIG. 8 is a graph illustrating the relation between the shearing strain at belt ends of the first belt ply and intersection angles B;

FIG. 9 is a graph showing the relation between the shearing strain at belt ends of the second belt ply and intersection angles B;

FIG. 10 is a graph illustrating the relation between the shearing strain at belt ends of the first relieving ply and intersection angles B;

FIG. 11a is a schematic sectional view illustrating arrangements of plies and cords;

FIG. 11b is a graph illustrating circumferential displacements of the cords at positions in width directions;

FIG. 12a is a schematic sectional view illustrating arrangements of plies and cores of a tire of the prior art;

FIG. 12b is a graph illustrating circumferential displacements of the cords at positions in width directions;

Figure 5:
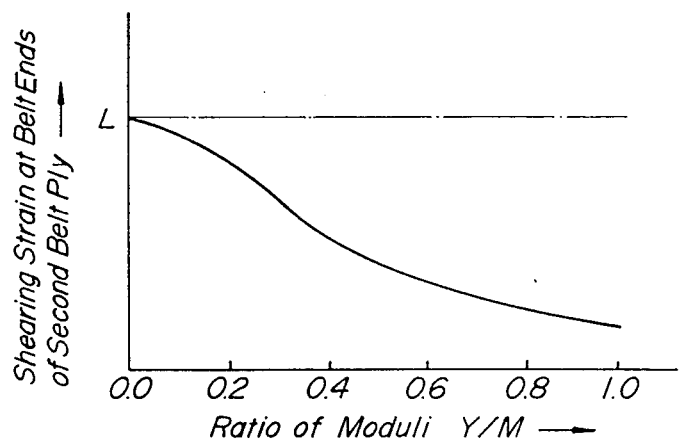
FIG. 5 is a graph illustrating the relation between the shearing strain at belt ends of the second belt ply and ratio of moduli.

FIGS. 13a, 13b and 13c are schematic sectional views illustrating arrangements of plies for the comparison tire 1 and sample tires 1 and 2;

FIGS. 14a, 14b and 14c are schematic sectional views illustrating arrangements of plies for the comparison tire 2 and sample tires 3 and 4; and FIGS. 15a, 15b and 15c are schematic sectional views illustrating arrangements of plies for the comparison tire 3 and sample tires 5 and 6.

DESCRIPTION OF THE PREFERRED EMBODIMENTS

Referring to FIGS. 1 and 2, a heavy-duty pneumatic radial tire 1 to be used for a large construction vehicle or the like comprises a carcass layer 2 reinforced by radially extending cords and belt layers 3 arranged radially outwardly of the carcass layer 2. The belt layer 3 consists of a plurality (three in this embodiment) of belt plies 4 piled one above others. These belt plies 4 are generally referred to as first, second and third belt plies 4a, 4b and 4c in the order from the innermost ply to the outermost ply. In this embodiment, a width Wb of the second belt ply 4b is the widest, while a width Wc of the third belt ply 4c is the narrowest. A width Wa of the first belt ply 4a is intermediate the widths Wb and Wc. These belt plies 4a, 4b and 4c are arranged in symmetry with respect to an equatorial plane 6 of the tire and are reinforced by a number of parallel cords 5a, 5b and 5c intersecting the equatorial plane 6 with predetermined intersection angles Aa, Ab and Ac, respectively. Oblique directions of the cords 5a, 5b and 5c adjacent to each other are opposite with respect to the equatorial plane 6. In this embodiment, for example, the cords 5a extend from the upper left to the lower right, while the cords 5b adjacent to the cord 5a extend from the upper right to the lower left as viewed in FIG. 2. The cords 5c extend from the upper left to the lower right. In this embodiment, moreover, it is sufficient that the cords of at least two adjacent belt plies are oblique in opposite directions. For example, it may be allowed that the cords 5a and 5b extend from the upper left to the lower right, while the cords 5c extend from the upper right to the lower left viewed in FIG. 2.

A first relieving ply 7 is arranged overlapping and radially outwardly of the belt layer 3. The first relieving ply 7 has a width X wider than the width Wb of the second belt ply 4b which is the maximum width of the belt ply 4 and a modulus Y less than a modulus M of the belt ply 4. Moreover, the first relieving ply 7 is reinforced by cords 8 in the same manner in the belt ply 4. Oblique directions of the cords 8 with respect to the equatorial plane 6 are substantially the same as the oblique directions of the cords 5b of the second belt ply 4b. The "modulus" used herein means a Young's modulus of the ply in directions in which the cords extend. It is generally obtained by multiplying a Young's modulus of the cords themselves by a ratio of total sectional area of the cords to a unit sectional area of the ply obtained by the product of a unit width and a cord diameter. The unit of the modulus is Kgf/mm$^2$. The modulus can be decreased for example by making small the diameter of the cords, widening distances between the cords or lowering the Young's modulus of the cords themselves.

It is preferable that the width X of the first relieving ply 7 is more than the width Wb of the second belt ply 4b and less than 1.3 times the width Wb. If the width X is less than the width Wb, shearing strains at belt ends of the second belt ply 4b exceed a limit value L of occurrence of separation as shown in FIG. 3, so that there is a risk of separation. If the width X is more than 1.3 times the width Wb, shearing strains at belt ends of the first relieving ply 7 exceed a limit value L of occurrence of separation as shown in FIG. 4, so that there is a risk of separation. The graphs of FIGS. 3 and 4 are obtained under a condition that a value N is 0.3 which is obtained by dividing the modulus Y of the first relieving ply 7 by the modulus M of the second belt ply 4b, and intersection angles B of the cords 8 with the equatorial plane 6 are substantially equal to the intersection angles $A_b$ of the cords 5b.

Figure 6:
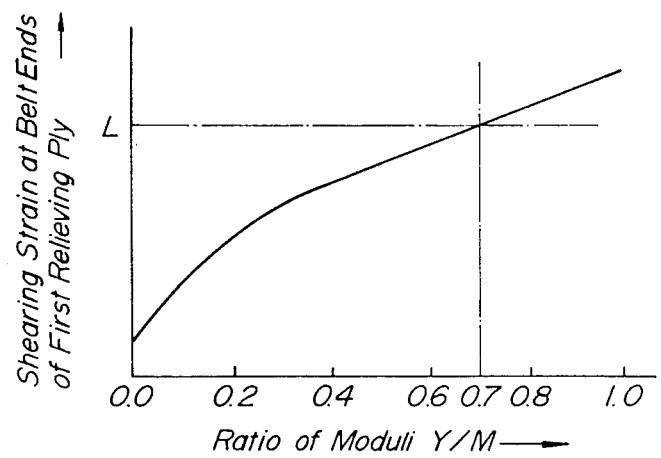
FIG. 6 is a graph showing the relation between the shearing strain at belt ends of the first belt ply and ratio of moduli.

The modulus Y of the first relieving ply 7 is preferably within a range of 0.2–0.7 times the modulus M of the second belt ply 4b. If the modulus Y is less than 0.2 times the modulus M, it becomes difficult to manufacture the first relieving ply 7. On the other hand, if the modulus Y is more than 0.7 times the modulus M, shearing strains at the belt ends of the first relieving ply 7 exceed a limit value L of occurrence of separation as shown in FIGS. 5 and 6, so that there is a risk of occurrence of separation. The graphs shown in FIGS. 5 and 6 are obtained under a condition that the width X of the first relieving ply 7 is 1.1 times the width Wb of the second belt ply 4b, while the intersection angles B of the cords 8 are substantially equal to the intersection angles Ab of the cords 5b.

Moreover, the intersection angles B of the cords 8 are preferably less than 45° and more than a value obtained by subtracting 5° from the intersection angles Ab of the cords 5b. If the intersection angles B are more than 45°, displacements of the cords 8 become small so as to not significantly reduce shearing strains at the belt ends of the second belt ply 4b as shown in FIGS. 7 and 9. On the other hand, if the intersection angles B are less than the value obtained by substracting 5° from the intersection angles Ab, shearing strains at the belt ends of the first relieving ply 7 exceed a limit value L of occurrence of separation as shown in FIGS. 8 and 10, so that there is a risk of occurrence of separation. The graphs in FIGS. 7, 8, 9 and 10 are obtained under a condition that the width X of the first relieving ply 7 is 1.1 times the width Wb of the second belt ply 4b, and a value is 0.3 which is obtained by dividing the modulus Y of the first relieving ply 7 by the modulus M of the second belt ply 4b. The intersection angles Ab of the cords 5b are 30° in FIGS. 7 and 8 and 15° in FIGS. 9 and 10.

In this embodiment, moreover, the third belt ply 4c whose width is less than the width of the second belt ply 4b having the maximum width is arranged radially outwardly of the second belt ply 4b. In order to prevent separations at belt ends of the third belt ply 4c, a second relieving ply 11 is arranged radially outwardly of the third belt ply 4c and radially inwardly of the first relieving ply 7. A width Z of the second relieving ply 11 is more than the width Wc of the third belt ply 4c and less than the width Wb of the second belt ply 4b. The second relieving ply 11 has a modulus V which is less than the modulus M of the third belt ply 4c. The second relieving ply 11 is reinforced by cords 12 whose oblique directions relative to the equatorial plane 6 are substantially equal to the oblique directions of the cords 5c of the third belt ply 4c relative to the equatorial plane 6.

The modulus V of the second relieving ply 11 is preferably 0.2–0.7 times the modulus M of the third belt ply 4c, while intersection angles C of the cords 12 of the second relieving ply 11 with the equatorial plane 6 are preferably less than 45° and more than a value obtained by subtracting 5° from the intersection angles Ac of the cords 5c in the same reasons above described. Moreover, even if the second relieving ply 11 (K2) is arranged radially outwardly of the first relieving ply K1 as shown in FIG. 15b, the second relieving ply K2 scarcely affects the rubber at the belt ends of the third belt ply P3 beyond the first relieving ply K1 so that the prevention of separation cannot be accomplished.

The function of one embodiment of the invention will be explained hereinafter.

When a load is applied to the tire 1 as above described, the belt layer 3 is pulled to displace the first, second and third belt plies 4a, 4b and 4c and cords 5a, 5b, 5c, 8 and 12 of the first and second relieving plies 7 and 11. Such displacements progressively increase as the displaced portions are nearer to ends of the plies in width directions. Moreover, the wider the plies, the larger are the displacements of the plies and cords. Moreover, the rubber about both ends of the cords 8 of the first relieving 7 has been displaced accompanied with the cords 8 and has pulled rubber surrounding the rubber in the same directions to deform it to some extent. In this case, since the oblique directions of the cords 8 of the first relieving ply 7 are substantially the same as those of the cords 5b of the second belt ply 4b having the maximum width, and the width X of the cords 8 is more than the width Wb of the second belt ply 4b, the rubber in the proximity of both the ends of the cords 5b of the second belt ply 4b where the maximum circumferential shearing strains occur when loaded is deformed to some extent in the same directions. As a result, the relative displacemnet between both the ends of the cords 5b and the rubber in the proximity of both the ends of the cords 5b is reduced to decrease the circumferential shearing strains in the rubber. Therefore, the separation at the belt ends of the second belt ply 4b having the maximum width is effectively prevented. On the other hand, the separation at the belt ends of the third belt ply 4c is similarly effectively prevented by the second relieving ply 11.

In this case, moreover, as the modulus Y of the first relieving ply 7 is less than the modulus M of the second belt ply 4b, the displacement of the cords 8 at the belt ends of the first relieving ply 4b is not very large as shown in FIG. 1b, even if the width X of the first relieving ply 7 is more than the width Wb of the second belt ply 4b. As a result, no separation is caused by circumferential shearing strains occurring at the belt ends of the first relieving ply 7.

Moreover, as the modulus Y is small and the first relieving ply 7 having the maximum width is arranged the radially outermost position, if a tread rubber 1b is cut, any progress of the cut can be prevented. Even if cracks occur in the rubber in the proximity of both the ends of the plies 4 and 11, any progress of the cracks is prevented because of the first relieving ply 7 restraining the rubber thereat. Furthermore, FIGS. 12a and 12b illustrate the displacements at cord ends of belt plies constructed according to the prior art for the purpose of comparison. As can be seen from FIGS. 12a and 12b, great circumferential shearing strains occur at belt ends of maximum width belt ply.

Results of experiments will be explained hereinafter. In these experiments, three kinds of tires were prepared, middle size tires for small-type trucks, large size tires for trucks or buses, and extra large size tires for large type construction vehicles. For the middle size tires, there were provided comparison tires 1 having three plies of the prior art and sample tires 1 and 2 according to the invention as shown in FIGS. 13a, 13b and 13c. For the large size tires, comparison tires 2 having four plies of the prior art and sample tires 3 and 4 according to the invention were prepared as shown in FIGS. 14a, 14b and 14c. Comparison tires 3 having five plies according to the prior art and sample tires 5 and 6 according to the invention were prepared for the extra large size tires as shown in FIGS. 15a, 15b and 15c. Sizes of these tires were LVR 7.00 R16, TBR 10.00 R20 and ORR 36.00 R51 for the middle, large and extra large size tires, respectively.

In the comparison tire 1 and the sample tires 1 and 2, intersection angles of cords of first and second belt plies P1 and P2 with equatorial planes were 19° from upper right to lower left and 19° from upper left to lower right, respectively, and moduli of belt plies of these comparison and sample tires were 5,757 kgf/mm$^2$. With the comparison tire 1, intersection angles of cords of auxiliary belt ply H1 were 67° from upper right to lower left and modulus of the belt plies was 3,704 kgf/mm$^2$. With the sample tires 1, intersection angles of cords of relieving ply K1 were 19° from upper right to lower left and the modulus of the belt plies was 3,704 kgf/mm$^2$. In the sample tire 2, intersection angles of cords of relieving ply K1 were 19° from upper left to lower right and the modulus of the belt plies was 3,704 kgf/mm$^2$.

In the comparison tire 2 and the sample tires 3 and 4, intersection angles of cords of first and second belt plies P1 and P2 are 18° from upper right to lower left and 18° from upper left to lower right and moduli are 6,450 kgf/mm$^2$. In the comparison tire 2, an auxiliary belt ply H1 has intersection angles 65° of cords from upper right to lower left and modulus 6,450 kgf/mm$^2$ of the ply, and an auxiliary belt ply H2 has intersection angles 18° of cords from upper left to lower right and modulus 4,680 kgf/mm$^2$ of the ply. Moreover, with the sample tire 3, an auxiliary belt ply H1 has intersection angles 65° of cords from upper right to lower left and modulus 6,450 kgf/mm$^2$ of the ply, and a relieving ply K1 has intersection angles 18° from upper right to lower left and modulus 3,000 kgf/mm$^2$ of the ply. With the sample tire 4, a first relieving ply K1 has intersection angles 18° of cords from upper right to lower left modulus 4,000 kgf/mm$^2$ of the ply, and a second relieving ply K2 has intersection angles 18° of cords from upper left to lower right and modulus 4,000 kgf/mm$^2$ of the ply.

In the comparison tire 3, and the sample tires 5 and 6, first, second and third belt plies P1, P2 and P3 have intersection angles of cords 40° from upper left to lower right, 21° from upper left to lower right and 21° from upper right to lower left, respectively, and moduli of 7,500 kgf/mm$^2$. In the comparison tire 3, an auxiliary belt ply H1 has intersection angles 21° from upper left to lower right and modulus of 7,500 kgf/mm$^2$, and an auxiliary belt ply H2 has intersection angles 21° from upper right to lower left and modulus of 7,500 kgf/mm$^2$. In the sample tire 5, a first relieving ply K1 has intersection angles 21° of cords from upper left to lower right and modulus 3,500 kgf/mm$^2$, and a second relieving ply K2 has intersection angles 21° of cords from upper right to lower left and modulus of 3,500 kgf/mm$^2$. In the sample tire 6, moreover, a first relieving ply K1 has intersection angles 21° of cords from upper left to lower right and module of 3,500 kgf/mm$^2$, and a second relieving ply K2 has intersection angles 21° of cords from upper right to lower left and modulus of 3,500 kgf/mm$^2$. Widths of the plies of these tires are shown in mm in the drawings.

Using the tires described above, circumferential shearing strains at belt ends of the belt plies were first determined by a simulation calculation according to the finite-element method. In this case, it was assumed that the respective tires were subjected to 100% of load on a flat surface. Results of calculation are shown in Tables 1-3. The shearing strain at belt ends of the first belt ply P1 of the comparison tire 1 was 22% which was assumed as an index 100 for the middle size tires. The shearing strain at belt ends of the first belt ply P1 of the comparison tire 2 was 39% which was assumed as an index 100 for the large size tires. The shearing strain at belt ends of the first belt ply P1 of the comparison tire 3 was 35% which as assumed as an index 100 for the extra large size tires.

TABLE 1

|  | Shearing strain of first belt ply P1 | Shearing strain of second belt ply P2 | Durability |
| --- | --- | --- | --- |
| Comparison tire 1 | 100 | 80 | 100 |
| Sample tire 1 | 80 | 85 | 120 |
| Sample tire 2 | 90 | 70 | 118 |

TABLE 2

|  | Shearing strain of first belt ply P1 | Shearing strain of second belt ply P2 | Durability |
| --- | --- | --- | --- |
| Comparison tire | 100 | 90 | 100 |
| Sample tire 3 | 90 | 92 | 122 |
| Sample tire 4 | 85 | 80 | 146 |

TABLE 3

|  | Shearing strain of second belt ply P2 | Shearing strain of third belt ply P3 | Durability |
| --- | --- | --- | --- |
| Comparison tire 3 | 100 | 92 | 100 |
| Sample tire 5 | 78 | 90 | 148 |
| Sample tire 6 | 79 | 72 | 170 |

A drum durability test wherein a tire was urged against a rotating drum was carried out on these tires. Results are shown in the Tables by indexes. The durability test was effected under the following conditions. For the middle, large and extra large size tires, diameters of the drums were 1.7 m, 1.7 m and 5.0 m, respectively, and loads were 1,845 kg, 4,050 kg and 67,500 kg, respectively, which were 1.5 times the normal loads of Standard of JATMA (Japanese Automobile Tire Manufacturer Association), respectively. Inner pressure of the tires was the standard inner pressure, 6 kg/cm$^2$, 7.25 kg/cm$^2$ and 7 kg/cm$^2$ and speeds were 60 km/h, 60 km/h and 8 km/h, respectively. The tires were rolled on the drums under these conditions and running distances when failures occurred were measured. The comparison tires 1, 2 and 3 failed first at running distances of 12,000 km, 21,000 km and 6,160 km which were assumed an index 100 for the tires of the middle, large and extra large size as shown in the Tables.

It is understood from these Tables that the circumferential shearing strains at the belt ends of the maximum width belt plies of the sample tires 4 and 6 are remarkably reduced and the durability of the tires is considerably improved.

Although the relieving plies have been arranged radially outwardly of the maximum width belt ply in the above embodiments, they may be arranged radially inwardly of the maximum width belt ply in this invention.

As can be seen from the above explanation, the separation at the belt ends of the maximum width belt ply is effectively prevented according to the invention.

It is further understood by those skilled in the art that the foregoing description is that of preferred embodiments of the disclosed tires and that various changes and modifications may be made in the invention without departing from the spirit and scope thereof.

What is claimed is:

1. A pneumatic radial tire comprising: a belt layer consisting of at least two belt plies reinforced by cords, one of said belt plies having a width wider than that of the other of said at least two belt plies, among which cords of at least two adjacent belt plies are oblique in opposite directions with respect to an equatorial plane of the tire, a first relieving ply arranged overlapping said belt plies and having a modulus less than that of said belt plies and a width wider than that of a belt ply having the widest width among said belt plies, said first relieving ply being positioned with respect to said belt ply having a width wider than that of the other of said at least two belt plies such that no other ply having a width wider than the width of said wider belt ply is placed therebetween, cords reinforcing and first relieving ply being oblique with respect to said equatorial plane in the same directions as those of cords of the belt ply having the widest width and, all of said belt plies and said relieving ply are symmetrical to an equatorial line of said tire.

2. A pneumatic radial tire as set forth in claim 1, wherein said width of the first relieving ply is 1.0–1.3 times the width of the belt ply having the widest width.

3. A pneumatic radial tire as set forth in claim 1, wherein the modulus of the first relieving ply is 0.2–0.7 times a modulus of the belt ply having the widest width.

4. A pneumatic radial tire as set forth in claim 1, wherein intersection angles of the cords of the first relieving ply with the equatorial plane is less than 45°, and more than an angle obtained by subtracting 5° from intersection angles of the cords of the belt ply having the widest width.

5. A pneumatic radial tire as set forth in claim 1, wherein a second relieving ply is arranged overlapping said belt plies and said first relieving ply.

6. A pneumatic radial tire as set forth in claim 5, wherein said first relieving ply is arranged radially outwardly of said second relieving ply, and said second relieving ply is arranged radially outwardly of said belt plies.

7. A pneumatic radial tire as set forth in claim 5, wherein a width of said second relieving ply is more than a width of the belt ply adjacent thereto, and a modulus of said second relieving ply is less than a modulus of the belt ply adjacent thereto, and wherein cords reinforcing said second relieving ply are oblique with respect to the equatorial plane in the same directions as those of cords of the belt ply adjacent thereto.

8. A pneumatic radial tire as set forth in claim 7, wherein the modulus of the second relieving ply is 0.2–0.7 times the modulus of the belt ply adjacent thereto and intersection angles of the cords of said second relieving ply with the equatorial plane is less than 45° and more than an angle obtained by subtracting 5° from intersection angles of the cords of the belt ply adjacent thereto.

* * * * *